United States Patent
Carey

(10) Patent No.: US 9,415,363 B2
(45) Date of Patent: Aug. 16, 2016

(54) METHOD AND APPARATUS FOR EFFICIENT ON-DEMAND PRODUCTION OF $H_2$ AND $O_2$ FROM WATER USING WASTE HEAT AND ENVIRONMENTALLY SAFE METALS

(75) Inventor: Jeff Carey, Oakland, CA (US)

(73) Assignee: Marine Power Products Corporation, Oakland, CA (US)

(*) Notice: Subject to any disclaimer, the term of this patent is extended or adjusted under 35 U.S.C. 154(b) by 573 days.

(21) Appl. No.: 12/706,639

(22) Filed: Feb. 16, 2010

(65) Prior Publication Data

US 2010/0224502 A1  Sep. 9, 2010

Related U.S. Application Data

(60) Provisional application No. 61/154,282, filed on Feb. 20, 2009.

(51) Int. Cl.
*C25B 1/04* (2006.01)
*C25B 15/08* (2006.01)
(Continued)

(52) U.S. Cl.
CPC ... *B01J 7/02* (2013.01); *C01B 3/04* (2013.01); *C01B 13/0203* (2013.01); *C25B 1/04* (2013.01); *C25B 15/08* (2013.01); *B01J 2219/00006* (2013.01); *B01J 2219/00144* (2013.01); *Y02E 60/364* (2013.01); *Y02E 60/366* (2013.01); *Y02P 20/129* (2015.11)

(58) Field of Classification Search
CPC .................................................. C25B 1/02–1/12
USPC ........................................ 205/628–639, 340
See application file for complete search history.

(56) References Cited

U.S. PATENT DOCUMENTS 4,004,067 A * 1/1977 Briggs et al. ..................... 429/57
4,144,147 A * 3/1979 Jarrett et al. .................... 205/340
(Continued)

FOREIGN PATENT DOCUMENTS

CN  101160258 A  4/2008
EP  1249052 B1  4/2009
(Continued)

OTHER PUBLICATIONS

Hydrogen Production—Wikepedia, the free encyclopedia, pp. 4-7, http://en.wikipedia.org/wiki/Hydrogen_production.
(Continued)

*Primary Examiner* — Nicholas A Smith
*Assistant Examiner* — Brian W Cohen
(74) *Attorney, Agent, or Firm* — Haverstock & Owens LLP

(57) ABSTRACT

A method of and apparatus for efficient on-demand production of $H_2$ and $O_2$ from water and heat using environmentally safe metals are disclosed. In one aspect, the apparatus for the hydrogen generation through water decomposition reaction includes a main reactor, an oxidizer reactor, and a computer controlling system. The main reactor contains a hydrogen generating substance, such as aluminum hydroxide. In some embodiments, the main reactor includes hydroxide shuttles, such as Cu ion and Ag ion. In another aspect, the system for hydrogen generation through water decomposition includes the steps of (1) REDOX reaction, (2) pre-generation reaction, (3) generation reaction, (4) regeneration reaction, (5) second hydrogen reaction, and (6) oxygen reaction.

15 Claims, 8 Drawing Sheets

(51) Int. Cl.
 C25B 15/00 (2006.01)
 B01J 7/02 (2006.01)
 C01B 3/04 (2006.01)
 C01B 13/02 (2006.01)

(56) References Cited

U.S. PATENT DOCUMENTS

| | | | |
|---|---|---|---|
| 4,358,291 A | 11/1982 | Cuomo et al. | |
| 4,394,293 A | 7/1983 | Gratzel et al. | |
| 4,454,427 A | 6/1984 | Sosnowski et al. | |
| 5,219,671 A * | 6/1993 | Parker et al. | 429/422 |
| 5,796,799 A | 8/1998 | Kobayashi et al. | |
| 6,306,917 B1 | 10/2001 | Bohn et al. | |
| 6,843,903 B2 * | 1/2005 | Roe et al. | 205/638 |
| 7,125,480 B2 * | 10/2006 | Austin | 205/628 |
| 7,252,806 B1 | 8/2007 | Merritt | |
| 7,875,166 B2 | 1/2011 | Matthai et al. | |
| 7,989,507 B2 | 8/2011 | Rising | |
| 2001/0046113 A1 | 11/2001 | Schmidt | |
| 2002/0048548 A1 | 4/2002 | Chaklader | |
| 2004/0265678 A1 | 12/2004 | Hommura et al. | |
| 2005/0051439 A1 | 3/2005 | Jang | |
| 2006/0102468 A1 | 5/2006 | Monzyk et al. | |
| 2006/0118428 A1 * | 6/2006 | Baltrucki et al. | 205/637 |
| 2006/0180464 A1 * | 8/2006 | Griffin | 204/280 |
| 2006/0188436 A1 | 8/2006 | Griffin | |
| 2006/0249393 A1 | 11/2006 | Ghosh et al. | |
| 2007/0072949 A1 | 3/2007 | Ruud et al. | |
| 2007/0244208 A1 | 10/2007 | Shulenberger et al. | |
| 2009/0074611 A1 | 3/2009 | Monzyk et al. | |
| 2009/0101520 A1 | 4/2009 | Zhang et al. | |
| 2009/0110976 A1 | 4/2009 | Yoshida et al. | |
| 2009/0115190 A1 | 5/2009 | Devine | |
| 2009/0152126 A1 * | 6/2009 | Griffin | 205/632 |
| 2009/0277799 A1 * | 11/2009 | Grimes et al. | 205/350 |
| 2010/0000874 A1 | 1/2010 | Hinman et al. | |
| 2010/0004495 A1 | 1/2010 | Fareid et al. | |
| 2010/0133111 A1 | 6/2010 | Nocera et al. | |
| 2010/0224502 A1 | 9/2010 | Carey | |
| 2011/0041740 A1 | 2/2011 | Reilly | |
| 2011/0114075 A1 | 5/2011 | Mills | |
| 2013/0277231 A1 | 10/2013 | Greenberg | |
| 2013/0281553 A1 | 10/2013 | Kubic et al. | |

FOREIGN PATENT DOCUMENTS

| | | |
|---|---|---|
| EP | 2360230 A1 | 8/2011 |
| WO | 8910981 | 11/1989 |
| WO | 2010084358 A2 | 7/2010 |
| WO | 2011002527 A1 | 1/2011 |
| WO | 2012062529 A1 | 5/2012 |

OTHER PUBLICATIONS

Venere, Emil, "New Process Generates Hydrogen From Aluminum Alloy to Run Engines, Fuel Cells", Purdue University, http://news.uns.purdue.edu/x/2007a/070515WoodallHydrogen.html, May 15, 2007.

Perret, Robert, "II.F.1 Develpment of Solar-Powered Thermochemical Production of Hydrogen from Water", DOE Hydrogen Program, FY 2007 Annual Progress Report, pp. 128-135.

Kim, MingJoong et al., "Hydrogen generation from hydrolysis reaction through corrosion of Al—Cu alloy in alkaline water", Dep. of Materail Science and Engineering.

"Bayer process", hhtp://en.wikipedia.org/wiki/Bayer_proces, pp. 1-2.

Soler, Lluis et al., "Aluminum and aluminum alloys as sources of hydrogen for fuel cell applications", Journal of Power Sources, 2007, www.sciencedirect.com, www.elsevier.com/locate/jpowsour, pp. 144-149.

Currao et al., Water Splitting with Silver Chloride Photoanodes and Amorphous Silicon solar Cells. Photochemical and Photobiological Sciences, vol. 3, 2004, [retrieved on Nov. 19, 2013], Retrieved from the Internet. <URL: http://www.gioncalzaferri.ch/publikationen/Photochem_Photobiol_Sci_2004_3_1017%20Watersplitting.pdf>.entire document.

Peters, W.G., "Colloidal Silver Chemistry", http://www.wgpeters.com//colloidal-silver-chemistry//, pp. 1-3.

Frederick Lowenheim, "Electroplating", McGraw-Hill Book Company, New York 1979, p. 12-25.

David R. Lide et al., "CRC Handbook of Chemistry and Physics 76th Eddition", New York 1195-1996, p. 8-58.

* cited by examiner

METHOD AND APPARATUS FOR EFFICIENT ON-DEMAND PRODUCTION OF $H_2$ AND $O_2$ FROM WATER USING WASTE HEAT AND ENVIRONMENTALLY SAFE METALS

This application claims priority from U.S. Provisional Patent Application Ser. No. 61/154,282, filed Feb. 20, 2009 and entitled Method and Apparatus for Efficient On-demand Production of $H_2$ And $O_2$ From Water Using Environmentally Safe Metals, which is hereby incorporated herein by reference in its entirety for all purposes.

FIELD OF THE INVENTION

The present invention relates to the field of hydrogen and oxygen production. More specifically, the present invention relates to the field of on-demand hydrogen and oxygen production from water using heat, water, and environmental safe catalysts.

BACKGROUND OF THE INVENTION

Hydrogen is commonly produced from hydrocarbon fossil fuels. One of the significant problems of using hydrocarbon fossil fuels to generate hydrogen is that the process generates carbon dioxide ($CO_2$), a greenhouse gas. An alternative source for hydrogen production is water. Currently available methods of generating hydrogen from water include biological hydrogen production, electrolysis of water, chemical production, and thermochemical production.

Some researchers report that Group IV transitional metals react with water and generate hydrogen gas and a metal hydroxide. However, the conversion rates of these metals cannot produce large volumes of hydrogen gas for efficient and practical use. Furthermore, there are no efficient methods or apparatuses available to recycle the metal hydroxides and convert the hydroxide into hydrogen and oxygen.

SUMMARY OF THE INVENTION

A method and apparatus for efficient on-demand production of $H_2$ and $O_2$ from water and heat using environmentally safe metals are disclosed.

In one aspect, the apparatus for the hydrogen generation through water decomposition reaction includes a main reactor, an oxidizer reactor, and a computer controlling system.

In some embodiments, the main reactor contains electrodes, reactants, catalysts, and solvents. A voltage is applied to the electrodes for assisting the hydrogen production. The reactants and catalysts of the system include a hydrogen generating substance, water, and salts. The catalysts are able to be activated by the electrochemical methods. Hydrogen gas is generated with heat supplied in the main reactor. After or during the reaction, the solution in the main reactor flows to the oxidizer reactor for regeneration reactions. In some embodiments, the regeneration reaction liberates $O_2$ gas.

In some embodiments, the oxidizer reactor is configured for photolysis or thermolysis for an oxygen reaction.

In some embodiments, the computer controlling system controls the operation of the system and monitors the status of each reaction reactor and reaction conditions. The computer controlling system contains software to control and monitor reaction conditions, such as pH value, temperature, salinity, applied voltage, catalyst formulation, purity and quantity of the gases generated, water level, color, solution level, and other proper factors.

In one aspect, the system for hydrogen generation through water decomposition includes the reactions of (1) REDOX reaction, (2) pre-generation reaction, (3) generation reaction, (4) regeneration reaction, (5) second hydrogen reaction, and (6) oxygen reaction. The reactions are able to further include catalyst preparation procedures in some embodiments. The catalyst preparation procedure is able to be a pre-REDOX reaction. In alternative embodiments, the REDOX reaction is included in the procedure of the catalyst preparation.

In some embodiments, the REDOX reaction generates a pre-hydrogen generating substance. The REDOX reaction oxidizes or reduces the starting materials to different oxidation states and forms pre-hydrogen generating substance. In some embodiments, the pre-hydrogen generating substance reacts with water resulting in a hydrogen generating substance. In alternative embodiments, the pre-hydrogen generating substance reacts with hydroxide or other proper source that provides hydroxyl group resulting in the hydrogen generating substance. In some embodiments, the hydrogen generating substance is associated with some amount of water molecules.

In some embodiments, the starting material contains aluminum, aluminium metal, aluminium oxide, alumina, or bauxite. Alternatively, the starting material contains [Al(OH)$_4$]$^-$, Al(OH)$_3$, [Al(OH)$_2$]$^+$, Al$^{3+}$, or [Al(OH)]$^{2+}$. Alternatively, the starting materials contain group IA to VIIA elements such as magnesium, calcium, silicon, and gallium. Alternatively, the starting material contains group IB to VIIB elements such as zinc, nickel, iron, and copper. Alternatively, the starting material contains inner transitional elements. Alternatively, the starting material contains AlSi(OH)$_2$, Ni, Na$_2$(CO$_3$), or Li$_2$SO$_4$. A person skilled in the art will appreciate that the starting material is able to be the pre-hydrogen generating substance and the REDOX reaction is optional. Further, a person skilled in the art will appreciate that reacting starting material with water or hydroxide is optional, and the starting material is the hydrogen generating substance.

In some embodiments, the pre-generation reaction comprises setting up the AID (Active Ion Displacement) condition for the generating reaction. The pre-generating reaction applies a minimum starting voltage (e.g. 0.5V of DC) to the solution that contains the hydrogen generating substance. The pre-generating reaction makes the hydrogen generating substance, such as [Al(OH)$_3$.xH$_2$O] complex, compacting onto the Fe/Ni electrode surface. The pre-generation reaction is a process that requires low energy.

In some embodiments, the generation reaction generates hydrogen and a depleted hydrogen generating substance. For example, when [Al(OH)$_3$.xH$_2$O] is the hydrogen generating substance, the generation reaction through the AID reaction converts [Al(OH)$_3$.xH$_2$O] into [Al(OH)$_4$.(x−1)H$_2$O]$^-$. A person skilled in the art will appreciate that the above reaction is used as an example, the hydrogen generating substance is able to directly use water and/or hydroxide groups in the solution to generate hydrogens.

In some embodiments, the regeneration reaction regenerates the depleted hydrogen generating substance back to its active state or to an intermediate state, which subsequently becomes the active state of the hydrogen generating substance. For example, when the depleted hydrogen generating substance is [Al(OH)$_4$.(x−1)H$_2$O]$^-$, the regeneration reaction regenerates [Al(OH)$_4$.(x−1)H$_2$O]$^-$ back to [Al(OH)$_3$.xH$_2$O] directly. Alternatively, the regeneration reaction regenerates [Al(OH)$_4$.(x−1)H$_2$O]$^-$ to [Al(OH)$_3$.(x−1)H$_2$O], which subsequently goes back to the original state of [Al(OH)$_3$.xH$_2$O]. In some embodiments, the regeneration reaction is achieved by using a hydroxide shuttle reaction to take the hydroxide group away from the depleted hydrogen generating substance. In some embodiments, the hydroxide shuttle is copper ion, silver ion, copper hydroxide, silver hydroxide, or other proper metal and ions. In some embodiments, the hydroxide shuttle is a metal cluster, an alloy, or any proper multi metals aggregates. For examples, ions or metals of Ag—Ag, Cu—Cu, Ag—Cu, Ag—Al—Cu, and AgCu(OH).

In some embodiments, the second hydrogen reaction is able to further generate more hydrogen gas and/or ion. In some embodiments, the second hydrogen reaction converts the hydroxide that was taken by the hydroxide shuttle into hydrogen and metal oxide. For example, the second hydrogen reaction converts Ag(OH) or Ag(OH)$_2$ into AgO and/or Ag$_2$O and H$_2$.

In some embodiments, the oxygen reaction releases the oxygen of the metal oxide through photolysis, thermolysis, or other proper chemical reactions or physical interactions. Through this reaction, the hydroxide shuttle is regenerated.

More aspects and embodiments of the present invention are disclosed in the following. In some aspects, a catalytic water hydrolysis system is provided. The catalytic water hydrolysis system comprises a solution containing a hydrogen generating catalyst. The hydrogen generating catalyst contains aluminum ion, copper ion, and silver ion, a light providing device, and an electric activation device.

In some embodiments, the solution further comprises sodium ions. In alternative embodiments, the solution further comprises an ion from IA or IIA group. In other embodiments, the solution further comprises a salt in an amount sufficient as electrolyte. In some embodiments, the aluminium ion comprises aluminium hydroxide. In alternative embodiments, the aluminium ion comprises Al(OH)$_3$. In other embodiments, the copper ion comprises copper hydroxide and the silver ion comprises silver hydroxide or silver oxide. In some embodiments, the silver ion comprises silver oxide. In alternative embodiments, the solution comprises a sufficient amount of copper ions and silver ions to regenerate substantially all of the aluminum ion for the catalytic thermo hydrolysis. In some embodiments, the electricity applied is only used to activate the catalysts, and the energy supply for the hydrogen generation reaction is mainly coming from external heat absorbed by the system. In other embodiments, the system further comprises a heater. In some embodiments, the light providing device comprises LED or solar lights. In alternative embodiments, the light providing device provides lights having wavelengths approximately around the visible light region. In other embodiments, the system further comprises at least first and second chambers. The first chamber contains the electricity providing device for activating the catalysts, wherein the second chamber contains the light providing device fluidly coupling with the first chamber. In some embodiments, the system further comprises a controlling system, wherein the controlling system controls the transportation of the solution between the first chamber and the second chamber. In alternative embodiments, the controlling system comprises a computer automating substantial all of the transportation of the solution.

In alternative aspects of the present application, a hydrogen production system is provided. The hydrogen production system comprises an aqueous solution containing electrolyte, at least two electrodes electrically coupled with the aqueous solution, and an applied voltage for activating the catalysts for water-hydrolysis on a cathode on at least one electrode, wherein the applied voltage comprises a voltage magnitude smaller than 1.1V in magnitude. In some embodiments, the solution comprises aluminum ion, copper ion, and silver ion.

In other aspects of the present application, a method of electrically controlled catalytic hydrolysis is provided. The method of electrically controlled catalytic hydrolysis comprises applying a voltage to a metal catalyst in a solution containing a hydrogen generating catalyst, thereby generating hydrogen gas, wherein the hydrogen generating catalyst comprises aluminium ions, reacting the hydrogen generating catalyst with a catalyst reviving substance, wherein the catalyst reviving substance comprises copper ions, silver ions, or a combination thereof, and regenerating the catalyst reviving substance by exposing the catalyst reviving substance a light.

In some embodiments, the method further comprises heating the solution to approximately 90° F. In alternative embodiments, the light comprises a wavelength capable of regenerating the catalyst reviving substance to a state that is able to regenerate the hydrogen generating catalyst to a state that is able to generate hydrogen gas. In other embodiments, the light comprises a wavelength approximately in the range of 350 nm to 750 nm. In some embodiments, the light comprises a green LED light or sunlight. In alternative embodiments, the method further comprises dissociating an oxygen from the catalyst reviving substance. In alternative embodiments, the hydrogen generating catalyst lowers the activation energy of the electric hydrolysis to below 1.1V in magnitude. In other embodiments, the voltage is between −0.4V to −0.9V. In some embodiments, the method further comprises ionizing aluminum, copper, and silver into the solution. In alternative embodiments, the ionization is performed by applying a positive voltage to the aluminum, copper, silver, or a combination thereof.

In some aspects of the present application, a method of hydrogen production is provided. The method of hydrogen production comprises preparing a solution containing an ionic compound, wherein the solution contains some amount of aluminum, copper, and silver and applying a voltage to the solution causing an electric hydrolysis reaction, thereby generating hydrogen gas.

In some embodiments, the voltage comprises a voltage magnitude smaller than 1.0V in magnitude. In alternative embodiments, the method further comprises ionizing aluminum, copper, and silver into the solution by an applied voltage. In other embodiments, the voltage used to ionize the aluminum, copper, and silver is greater than the voltage causing the electric hydrolysis reaction. In some embodiments, the method further comprises forming some amount of white precipitate by applying the voltage. In alternative embodiments, the method further comprises heating the solution. In other embodiments, the method further comprises passing the solution through some amount of light. In some embodiments, the method further comprises an automatic controlling system. In alternative embodiments, the automatic controlling system controls a transportation of the solution from a location having electrically controlled hydrolysis reactions to a location having photolysis reactions.

In alternative aspects of the present invention, an electric hydrolysis catalyst is provided. The electric hydrolysis catalyst comprises a non-transitional metal electric hydrolysis catalyst and a first transitional metal capable of regenerating the non-transitional metal electric hydrolysis catalyst to an active state for an electric hydrolysis reaction.

In some embodiments, the catalyst further comprises a second transitional metal capable of regenerating the first transitional metal to an active state for regenerating the non-transitional metal electric hydrolysis catalyst to an active state for the electric hydrolysis reaction. In alternative embodiments, the non-transitional metal electric hydrolysis catalyst is able to react with a water molecule. In other embodiments, the non-transitional metal electric hydrolysis catalyst is able to form a chemical bonding with a hydroxyl group. In other embodiments, the first transitional metal is able to receive a hydroxyl group from the non-transitional metal electric hydrolysis catalyst. In some embodiments, the catalyst further comprises a second transitional metal capable of receiving a hydroxyl group from the first transitional metal. In alternative embodiments, the second transitional metal is capable of dissociating a bonded oxygen by receiving a light.

DETAILED DESCRIPTION OF THE PREFERRED EMBODIMENT

Apparatus for the System

Figure 1:
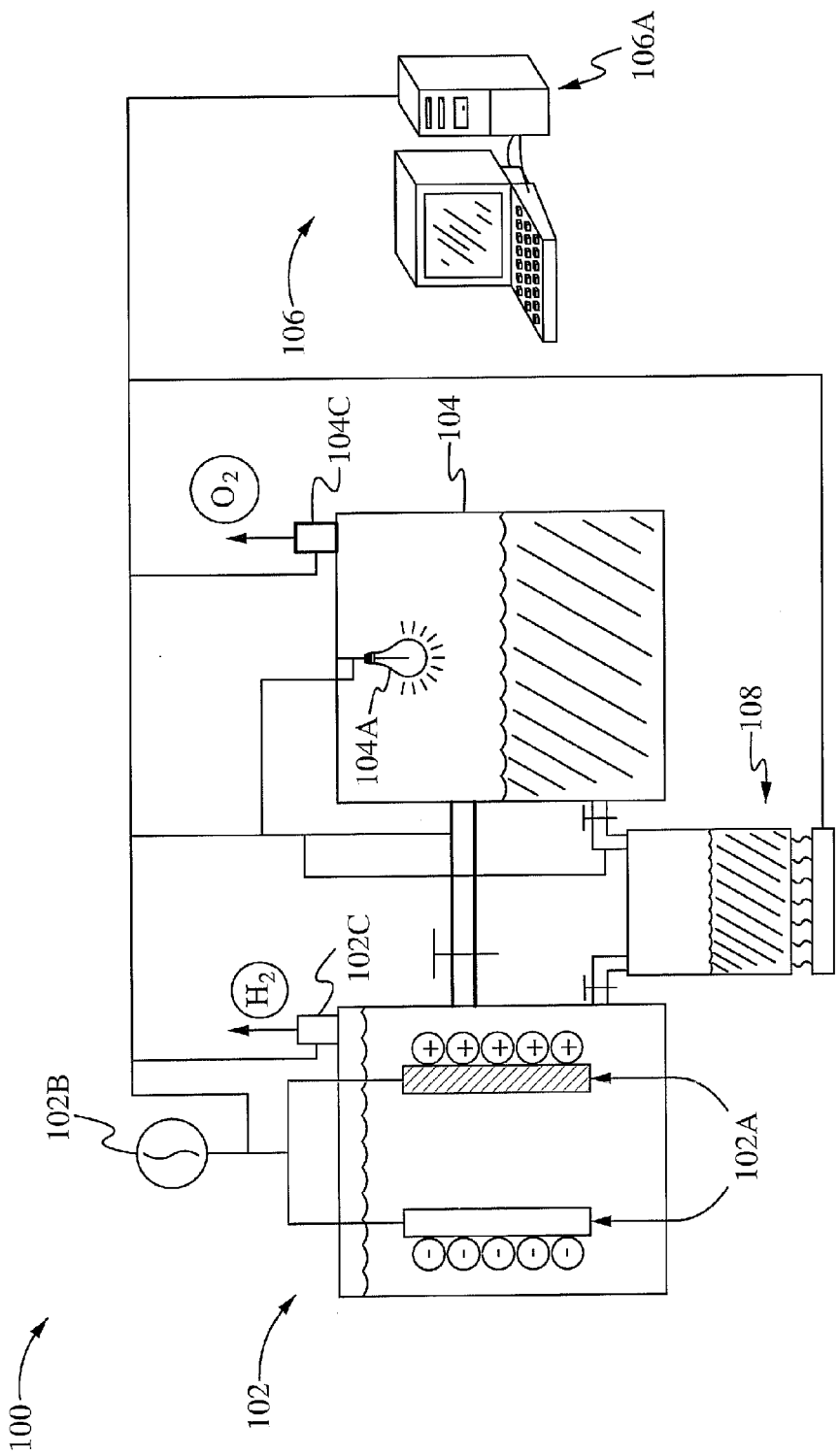
FIG. 1 illustrates the apparatus of the system 100 in some embodiments.

FIG. 1 illustrates the apparatus for the system 100 in some embodiments. In some embodiments, the apparatus for the hydrogen generation through water decomposition includes: a main reactor 102, an oxidizer reactor 104, a heat source 108, and a computer controlling system 106. In some embodiments, the main reactor is a chamber where hydrogen is generated. Further, the main reactor contains electrodes 102A, reactants, catalysts, and solvents. The electrodes 102A contain iron, graphite, stainless steel, alloy, or any other proper materials. In some embodiments, the stainless steel includes Stainless 302, 316, 316L, 421. In some embodiments, the electrodes are metal alloy, such as Fe/Al or Fe/Cr/Mn and Fe/Si/Mn alloys. In some embodiments, the alloys have a Fe/Al mole or weight ratio in 97/3, 95/5, or 93/7. A voltage is applied to the electrodes 102A. In some embodiments, the voltage is generated by a power source 102B. In some embodiments, the voltage applied is between 0.8V to 3.0V. Alternatively, the voltage applied is between 0.2V to 10.0V. In some embodiments, a negative 2.5V is applied to a graphite electrode and a positive 1.7V is applied to aluminium metal for 15 minutes, 1.4V is applied to copper metal for 10 minutes, and 1.0V is applied to silver metal for 5 minutes when ionizing the metals into the reaction solution. In alternative embodiments, a negative charge of 2.5V is applied to a graphite electrode and a positive charge of 2.5V is applied to aluminium, copper, and silver metals concurrently for about 30 minutes when ionizing the metals into the reaction solution. Further in some embodiments, a voltage between −0.4V to −0.9V is applied on a stainless steel electrode (cathode) during the electric hydrolysis reactions. It should be understood that the voltage range mentioned above is an example, and other proper voltages are able to be applied. The reactants and catalysts of the system include the hydrogen generating substance, water, and salts.

In some embodiments, the hydrogen generating substance contains a metal, a metal oxide, a metal hydroxide, or a metal derivative compound. Alternatively, the hydrogen generating substance contains an Al atom, Al ion, an atom with an atomic number 13, or combinations thereof. Alternatively, the hydrogen generating substance contains $[Al(OH)_4]^-$, $Al(OH)_3$, $[Al(OH)_2]^+$, $Al^{3+}$, or $[Al(OH)]^{2+}$. A person skilled in the art would appreciate that the hydrogen generating substance is able to contain group IA to VIIA elements such as magnesium, calcium, silicon, and gallium. In some alternative embodiments, the hydrogen generating substance contains group IB to VIIB elements, such as zinc, nickel, iron, and copper. Alternatively, the hydrogen generating substance contains inner transitional elements. A person skilled in the art would appreciate that other proper chemical elements, alloys, nano-materials, polymers, natural or synthetic compounds are able to be used. Further, a person skilled in the art would appreciate that the term bind, binding, bound, or functionally equivalent terms are examples of showing that two or more substances have interactions or forces between or among them. The present disclosure is not limited to actually binding, bonding, or forming chemical bonds.

In some embodiments, the water used has a salinity of about 1.5% by weight. Other proper percentages of salinity are able to be used, such as sea water having a salinity about 3.8%. The salts used are able to include NaCl (sodium chloride), $CaCl_2$ (calcium chloride), $Na_2CO_3$, or other proper ion sources. The gases generated, such as hydrogen, are transferred through the pipe 102C. After or during the reaction, the solution in the main reactor flows to the oxidizer reactor 104 for oxygen reactions.

In some embodiments, the oxidizer reactor 104 is configured for photolysis or thermolysis for the oxygen liberation reactions. The light source 104A generates lights for the photolysis reaction. The heat source 104B (not shown in the figure) generates heat for thermolysis. The gases generated are transferred through the pipe 104C. A person skilled in the art would appreciate that other proper methods or apparatus are able to be used for the oxygen reaction.

In some embodiments, the heat source for thermolysis is able to be an independent heat chamber 108. A person skilled in the art will appreciate that the heat chamber 108 is optional, and the setup of the present disclosure is able to be operated with or without chamber 108. A person skilled in the art will also appreciate that the heat source is able to be installed in the main reactor 102 or in any other proper chambers.

In some embodiments, the computer controlling system 106 controls the operations of the system and monitors the status of each reaction reactor and reaction conditions. The computer controlling system 106 contains a control software application 106A to control and monitor reaction conditions, such as pH value, temperature, salinity, applied voltage, purity and quantity of the gases generated, water level, catalyst formulation, and solution level. A person skilled in the art would appreciate that the computer controlling system 106 is able to be used for other purposes, including controlling and adjusting the reaction conditions.

A person skilled in the art would appreciate that the above stated setup is an example. Other proper setups are able to be applied to the system. The reaction reactors stated above are able to be modified into a single reactor. Additional reaction reactors are able to be added.

Reactions

In some embodiments, the system for hydrogen generation through water decomposition includes the reactions of (1) REDOX reaction, (2) pre-generation reaction, (3) generation reaction, (4) regeneration reaction, (5) second hydrogen reaction, and (6) oxygen reaction.

(1) REDOX Reaction

The REDOX reaction prepares a pre-hydrogen generating substance by oxidizing or reducing the starting materials. Subsequently, the pre-hydrogen generating substance reacts with water or hydroxide resulting in a hydrogen generating substance. The REDOX reaction is illustrated in the equation (1). Equation (2) illustrates that the pre-hydrogen generating substance reacts with water to form the hydrogen generating substance. A person skilled in the art will appreciate that the hydrogen generating substance is able to carry a certain amount of surrounding water in its surrounding sphere.

$$M \rightarrow M^{x+} + xe^- \qquad (1)$$

$$M^{x+} + yH_2O \rightarrow [M(OH)_y]^{x-y} + \frac{y}{2}H_2 \qquad (2)$$

In the equations (1) and (2), M and its ion form represent the core of the hydrogen generating substance and x and y represent charge parameters for oxidation state or reaction stoichiometry.

A person skilled in the art would appreciate that the REDOX reaction is one of the exemplary models, and the starting material is not required to go through the REDOX reaction to become an active catalyst for the hydrogen generation. In some embodiments, the hydrogen generating substance is the precursor of the actual hydrogen generating catalysts. Alternatively, the hydrogen generating substance is the hydrogen generating catalyst, and the starting material used is the precursor of the hydrogen generating substance.

(2) Pre-Generation Reaction

In some embodiments, the pre-generation reaction is a step of setting up the AID (Active Ion Displacement) condition for the generation reaction. The pre-generation reaction applies a minimum starting voltage (eg. 0.5V of DC) to the solution that contains the hydrogen generating substance. The pre-generating reaction makes the hydrogen generating substance, such as $[Al(OH)_3 \cdot xH_2O]$ complex, compacting onto the Fe electrode surface. The pre-generation reaction is a process that requires low energy. In some embodiments, it is observed that the pH of the solution is raised during the pre-generation reaction, and it can result from the liberation of the $OH^-$ group into the solution.

(3) Generation Reactions

In some embodiments, the generation reaction generates hydrogen and depletes the hydrogen generating substance. For example, when the hydrogen generating substance is $[Al(OH)_3]$, the generation reaction generates hydrogen gas and produces depleted hydrogen generating substance, $[Al(OH)_4]^-$. The substance $[Al(OH)_3]$ is used herein as an example. The hydrogen generating substance is also able to be $[M(OH)_4]^+$, $[M(OH)_3]$, $[M(OH)_2]^+$, $[M(OH)]^{2+}$, $M^{3+}$, or other proper chemicals that are able to perform similar reactions as described above.

Active Ion Displacement (AID)

In some embodiments, the generation reaction is achieved by an active ion displacement (AID) reaction. The chemical equations of the AID are illustrated in equation (3).

$$2[M(OH)_y \cdot z(H_2O)]^{p-y} \xrightarrow{AID-reaction}$$
$$2[M(OH)_{y+1} \cdot (z-1)(H_2O)]^{p-y-1} + H_2 \qquad (3)$$

In the equation (3), $[M(OH)_y \cdot z(H_2O)]^{p-y}$ is the chemical state of the hydrogen generating substance before the generation reaction. Z represents the number of water molecules surrounding the core of the hydrogen generating substance. P-Y represents the charges of the hydrogen generation substance binding with y amount of hydroxide. Y represents the number of hydroxides binding to the hydrogen generating substance before AID reaction. Through the AID reaction, the $[M(OH)_y \cdot z(H_2O)]^{p-y}$ with the assistance of applied electricity becomes $[M(OH)_{y+1} \cdot (z-1)(H_2O)]^{p-y-1}$. The above equation is an example to illustrate the concept of this disclosure. For example, the $[M(OH)_y \cdot z(H_2O)]^{p-y}$ is able to be $[Al(OH)_3 \cdot x(H_2O)]$ and the $[M(OH)_{y+1} \cdot (z-1)(H_2O)]^{p-y-1}$ is able to be $[Al(OH)_4 \cdot (x-1)(H_2O)]^-$. A person skilled in the art would appreciate that the hydrogen generating substance is also able to be in other chemical states, contain any other proper number of hydroxide groups, or contain other suitable ligands. In some embodiments, external heat aids the AID reactions.

The AID reaction is able to reduce water and associate the $OH^-$ group with the hydrogen generating substance. The AID reaction is further illustrated in equation (4), where $[Al(OH)_3 \cdot x(H_2O)]$ is used as an example of the hydrogen generating substance. The x equivalent of water surrounding the core of the hydrogen generating substance is used as an example. In some embodiments, the hydrogen generating substance is able to use the water in the solution directly.

$$[Al(OH)_3 \cdot x(H_2O)] \xrightarrow{AID} [Al(OH)_4 \cdot (x-1)(H_2O)]^- + 1/2H_2 \qquad (4)$$

Figure 2A:
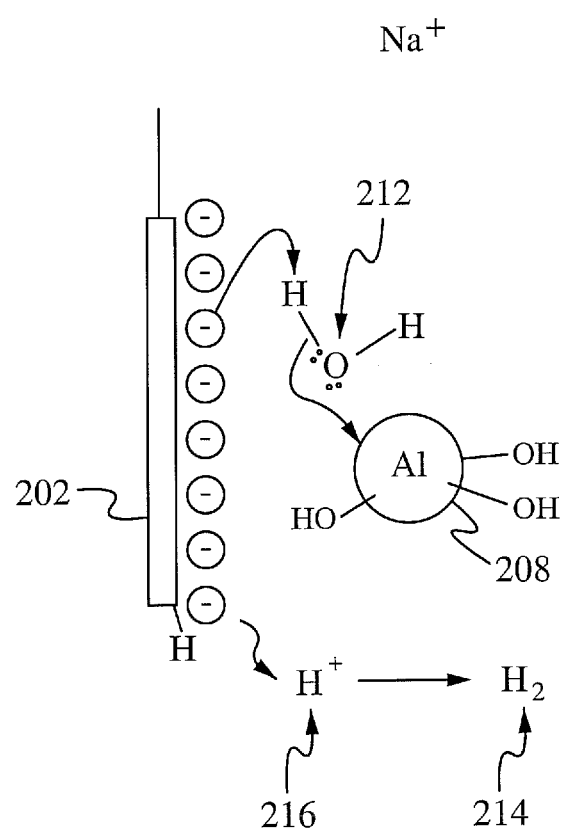
FIGS. 2A and 2B illustrate the generation and regeneration reaction in some embodiments.

FIG. 2A shows the reaction between the hydrogen generating substance 208 and the water molecules 212. In some embodiments of the AID reactions, the hydrogen generating substance 208 is $[Al(OH)_3 \cdot x(H_2O)]$, which reacts with water molecules 212 and generates protons ($H^+$) 216 or hydrogen 214. These mechanisms are described as examples. A person skilled in the art would appreciate that the hydrogen gas is able to be generated through a hydride and a proton or any other proper way of generating hydrogen gas. The hydrides and protons described in this disclosure are able to bind to the hydrogen generating substance, be generated by the hydrogen generation substance, and bind to other compounds in the solution. It is known by a person skilled in the art that amphoteric properties of aluminum hydroxides are able to add efficiency to the AID reaction of the generation reaction. It is observed that the pH of the solution is increased during the AID reaction, and it is able to be caused by the hydroxide generation or liberation in the AID reaction.

A person skilled in the art would also appreciate that the hydrogen generating substance is able to generate hydrogen through protons, hydrides, or combinations thereof by a single molecule or the cooperation of multi-molecules or atoms, such as alloys and a plurality of the same or different metal centers.

(4) Regeneration Reactions

In some embodiments, the regeneration reaction regenerates the hydrogen generating substance from the depleted hydrogen generating substance. For example, the $[Al(OH)_4 \cdot (x-1)(H_2O)]^-$ is able to be regenerated back to $[Al(OH)_3 \cdot x(H_2O)]$ or to $[Al(OH)_3 \cdot (x-1)(H_2O)]$.

The generation reaction and the regeneration reactions make the whole reaction work in a catalytic manner until the hydrogen generating substance converts to a less active state.

The chemical equation of the regeneration reaction is illustrated in equation (5).

$$[^1M(OH^-)_y] + ^2M^{+x} \rightarrow [^1M(OH^-)_{y-z}] + [^2M^{+x}(OH^-)_z] \qquad (5)$$

In the equation (5), $[^1M(OH^-)_y]$ is the depleted hydrogen generating substance, and $^2M^{+x}$ is a regenerating substance. The regeneration reaction strips the hydroxide group bonded to the depleted hydrogen generating substance, so the hydrogen generating substance regenerates from the state of depleted form, $[^1M(OH^-)_y]$, directly or indirectly back to the previous chemical state, such as $[^1M(OH^-)_{y-z}]$. The $^2M^{+x}$ is acting as a hydroxide shuttle, such as Ag, Ag(OH), Cu, and Cu(OH)$^{+1}$, that removes the hydroxide group from the depleted hydrogen generating substance. The above equation is an example to illustrate the concept of this disclosure. A person skilled in the art would appreciate that the hydrogen generating substance is able to be in other oxidation states, contain any other proper number of hydroxide groups, or contain other suitable ligands.

The regeneration reaction is able to dissociate the OH$^-$ group away from the hydrogen generating substance that OH$^-$ originally bonds. The regeneration reaction is illustrated in equations (6) and (7) using $[Al(OH)_4.(x-1)(H_2O)]^-$ as the example of the depleted hydrogen generating substance. A person skilled in the art will appreciate that the regeneration reaction is also able to occur between Ag(OH)$_r$ and Cu(OH)$_r$, which are able to act as the hydroxide shuttle for each other. R represents the numbers of hydroxides that are associated with the core of the hydroxide shuttle, and the value of R is able to be 0, 1, 2, or other proper numbers.

Figure 2B:
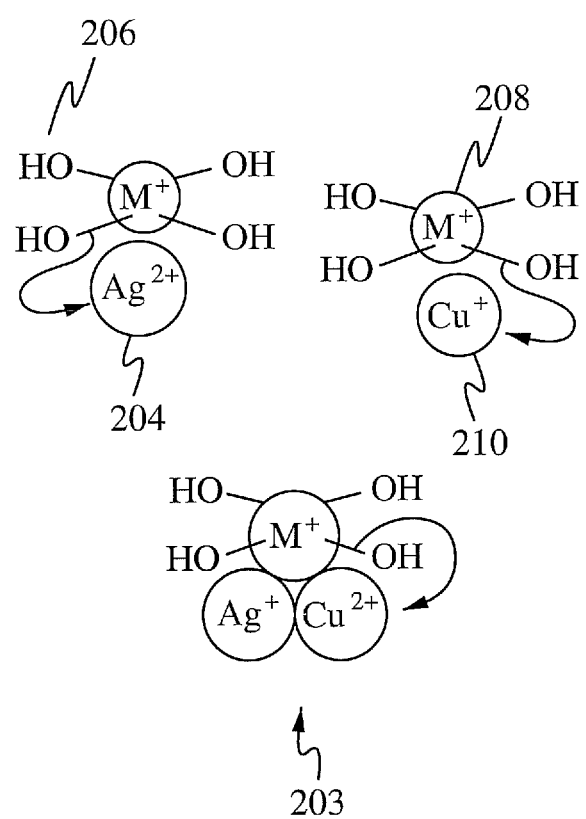

FIG. 2B illustrates the regeneration reaction. The hydrogen generating substance 208 binds the hydroxide group 206. The hydroxide shuttles 203, 204, or 210 are able to take the hydroxide group away from the depleted hydrogen generating substance 208. The hydroxide shuttle is able to be a silver ion 204, a copper ion 210, an aluminium ion 205 (not shown in the figure), multi-ion center aggregation 203, or other chemicals that take up the hydroxide group.

The term "regeneration reaction" includes any reactions that revive the depleted hydrogen generating substance back to the hydrogen generating substance that is active as a catalyst for assisting the electric hydrolysis. The term "hydroxide shuttle" is used as an illustration of the present disclosure, and includes removing any chemical substance from the hydrogen generating substance. As such, the hydroxide shuttle does not need to only remove hydroxyl groups. The hydroxide shuttle is able to act as a shuttle to remove hydride, hydrogen, or other substances that bind to or associate with the hydrogen generating substance.

(5) Second Hydrogen Reaction

In some embodiments, the generation reaction produces a depleted hydrogen generating substance, which is bonded with the additional hydroxide group. The regeneration reaction uses hydroxide shuttles to take the hydroxide group away from the depleted hydrogen generating substance. After taking the hydroxide group away from the depleted hydrogen generating substance, the hydroxide shuttle bonds with the hydroxide group. Subsequently, the second hydrogen reaction converts the hydroxide group bonded on the hydroxide shuttle into hydrogen and metal oxide. For example, Ag$^{2+}$ or Ag$^+$ takes hydroxide from Cu(OH)$_2$ or $[Al(OH)_4.(x-1)$ $(H_2O)]^-$ and becomes Ag(OH)$_2$ or Ag(OH) through the regeneration reaction. The second hydrogen reaction converts Ag(OH)$_2$ into AgO or Ag$_2$O and hydrogen.

(6) Oxygen Reaction

In the oxygen reaction, the oxygen of the metal oxide, which is generated in the second hydrogen reaction, is released from the metal oxide through photolysis, thermal decomposition, or other proper chemical reactions or physical interactions. Through the oxygen reaction, the hydroxide shuttle is regenerated, and the hydroxide shuttle is able to take hydroxide from the depleted hydrogen generating substance or other hydroxide bonded hydroxide shuttle again. For example, the silver ion is regenerated from silver oxide (AgO) through oxygen reaction. In some embodiments, the energy sources of the photolysis for the oxygen reaction are visible light, UV waves, microwave, radio frequency wave, gamma rays, x-rays, IR waves, and any other types of energy that a person skilled in the art would appreciate. In some embodiments, the metals that can be used as the hydroxide shuttle include aluminium, alumina, copper, iron, silver, zinc, magnesium, gallium, zinc, nickel, or any other metal or non-metal material or compounds that are capable of taking up hydroxide groups. The metal ion mentioned above is able to be in various oxidation states, such as silver is able to be Ag metal, Ag$^+$, or Ag$^{2+}$.

A person skilled in the art would appreciate that the oxygen reaction is able to be performed with heat, light, or other proper energy sources. Further, a person skilled in the art will appreciate that the second hydrogen reaction and oxygen reaction are part of the hydrogen generating reactions, and the so-called hydroxide shuttles are able to be part of the hydrogen generating substance.

Overall Reactions

Figure 3:
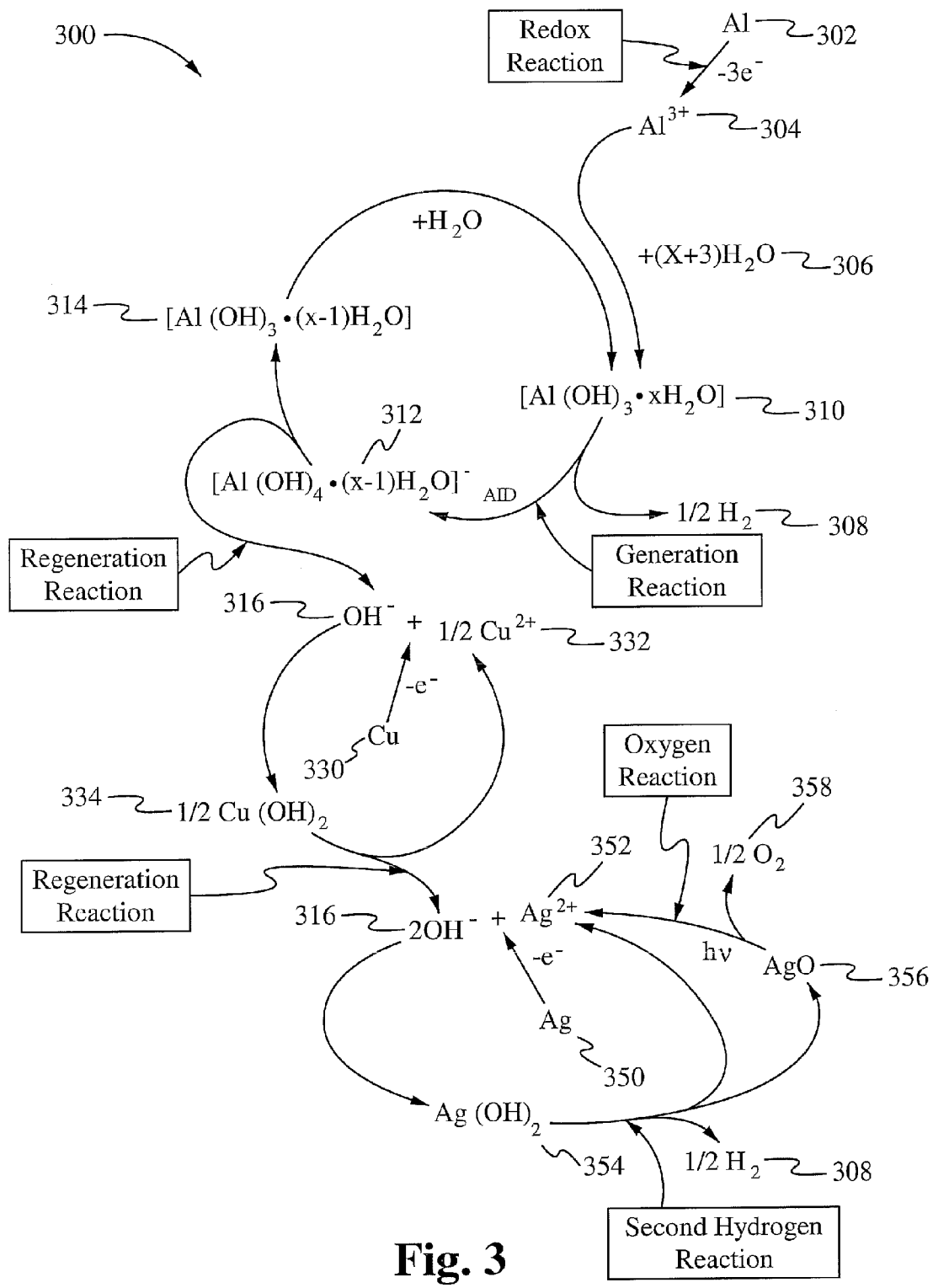
FIG. 3 illustrates the overall reaction of the system 300 in some embodiments.

FIG. 3 illustrates an overall reaction cycle in accordance with the system 300. The reaction begins from an aluminium (Al) metal 302. Through the REDOX reaction, the Al metal 302 becomes Al$^{3+}$ 304. Alternatively, the aluminium ion 304 is generated from other sources of Al ion such as bauxite, Na[Al(OH)$_4$], Al(OH)$_3$, NaAlO$_2$, Na$_2$AlO$_4$, Na$_5$AlO$_4$, NaAl$_{11}$O$_{17}$, and any other proper Al ion sources. The Al ion 304 reacts with water (H$_2$O) 306 generating hydrogen gas 308 and the hydrogen generating substance, aluminium hydroxide $[Al(OH)_3.x(H_2O)]$, 310. With the assistance of the AID of the pre-generation reaction, the hydrogen generating substance 310 reacts with one surrounding water. Hydrogen gas is generated in the generation reaction and the hydrogen generating substance becomes depleted hydrogen generating substance, $[Al(OH)_4.(x-1)(H_2O)]^-$, 312. The regeneration reaction removes one OH$^-$ from $[Al(OH)_4.(x-1)(H_2O)]^-$ 312; thus, the depleted hydrogen generating substance, $[Al(OH)_4.(x-1)(H_2O)]^-$, 312 becomes the substance $[Al(OH)_3.(x-1)(H_2O)]$ 314. Subsequently, the $[Al(OH)_3.(x-1)(H_2O)]$ 314 associates with water and goes back to $[Al(OH)_3.x(H_2O)]$ 310. Through the generation and regeneration reactions, the hydrogen generating substance works in a catalytic manner.

In some embodiments, the regeneration reaction uses copper ion 332 or silver ion 352 as the hydroxide shuttle. The copper ion 332 and the silver ion 352 are able to be generated through REDOX reactions from metal or prepared from other proper ion sources. The hydroxide shuttles take up the hydroxide groups 316 and become a hydroxide bonded hydroxide shuttle, such as Cu(OH)$_2$ 334 and Ag(OH)$_2$ 354. A person skilled in the art will appreciate that the hydroxide shuttle is able to be in various oxidation states and bonded with various numbers of hydroxides 316.

In some embodiments, the second hydrogen reaction generates more hydrogen and converts the hydroxide bonded hydroxide shuttle, such as $Ag(OH)_2$ 354, into metal oxide, such as AgO 356.

In some embodiments, the oxygen reaction generates oxygen 358 and renews the metal oxide, such as AgO 356, into a renewed hydroxide shuttle. Through the second hydrogen reaction and the oxygen reaction, the hydroxide shuttles work in a catalytic manner.

Figure 4:
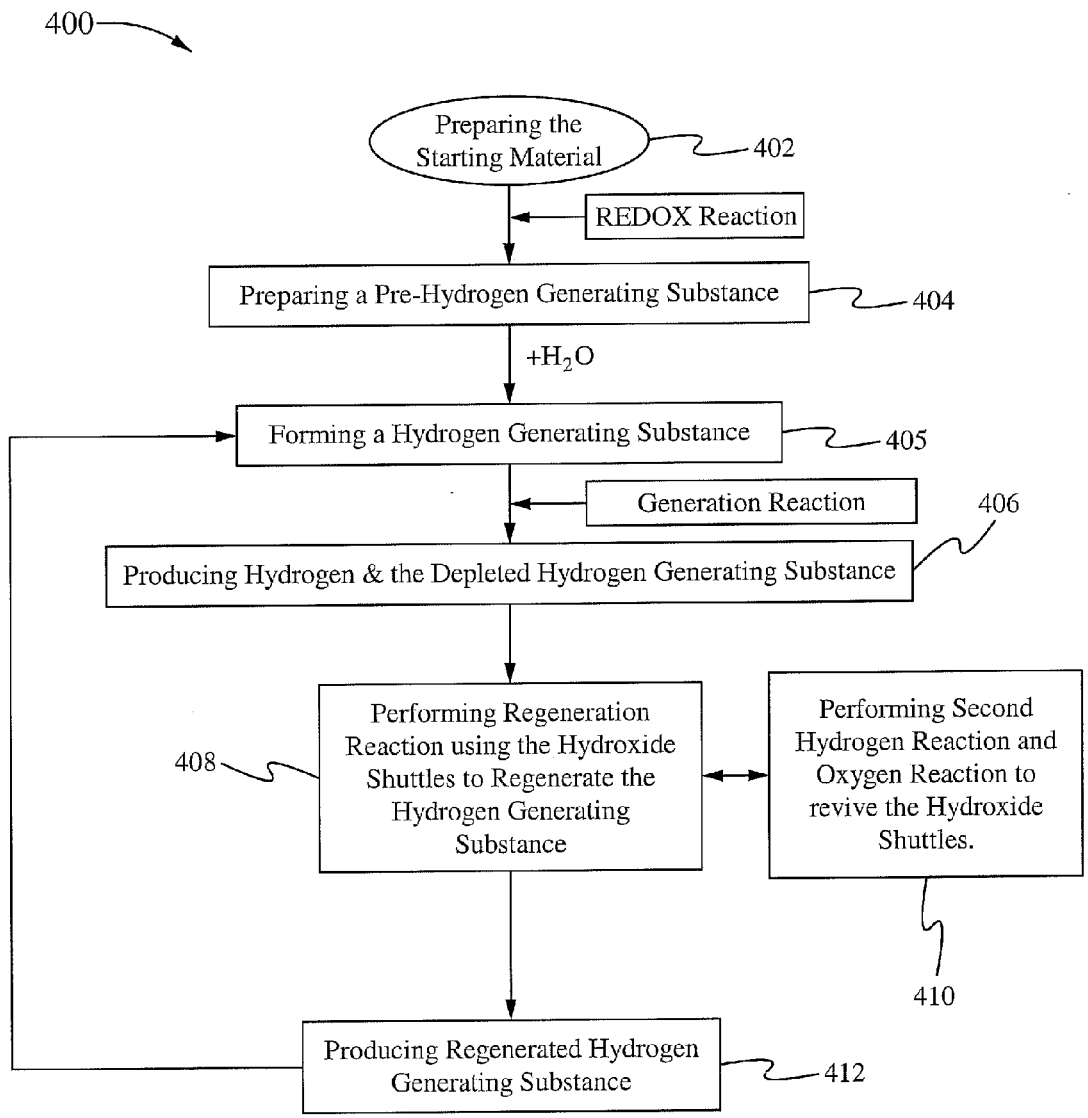
FIG. 4 illustrates the process of the hydrogen generation reaction 400 in some embodiments.

FIG. 4 further illustrates the process of the electrically controlled hydrogen generation reaction 400 in some embodiments. The process begins from preparing the starting material 402. At the step 404, the pre-hydrogen generating substance is prepared by the REDOX reaction. At the step 405, the pre-hydrogen generating substance reacts with water and becomes the hydrogen generating substance.

At the step 406, the generation reaction makes the hydrogen generating substance react with water or intramolecular hydrolysis reaction through applied voltage to produce hydrogen gas via electric hydrolysis reactions. The hydrogen generating substance becomes a depleted hydrogen generating substance. At the step 408, the regeneration reactions use hydroxide shuttles to regenerate the depleted hydrogen generating substance. At the step 410, the second hydrogen reaction and the oxygen reactions revive the hydroxide shuttle. At the step 412, the hydrogen generating substance is regenerated. After the step 412 the process goes back to the step 405, and the whole reaction works in a catalytic manner.

A person skilled in the art will appreciate that the above process is used as an example. All steps are optional and additional steps are able to be added. Further, the reactions are able to go through other mechanisms.

EXPERIMENTS

Example 1

In some embodiments, the experiments are performed as follows. The apparatus includes a main reactor, a photochemical/oxidizer reactor, and a thermal source. The main reactor core contains graphite and stainless steel plates as electrodes, reactants, or catalysts. The photochemical/oxidizer reactor contains a light source, such as light, sunlight receiver, solar water heater, or other proper lights or heaters.

The conditions and procedures of performing the reactions are described in detail below. The experiment begins from catalyst preparation. In the catalyst preparation procedure, water, salts, and the starting metals including substrates of Al, Cu, and Ag are placed into a catalyst preparation vessel. Next, the starting materials are prepared by using the REDOX reaction, which is described in the following paragraph. Subsequently, the product of the catalysts preparation reaction is transferred to the main reactor. The main reactor contains water that is able to be prepared from tap water, distilled water, deionized water, or sea water. The salts are added to bring the salinity to 1.5% by weight using NaCl.

In the REDOX reactions, the electricity is applied to the electrodes. The negative charge is connected to graphite electrodes and positive charge is connected to copper, silver, and aluminum substrates. The reactions are started by applying 1.8 volts of electricity or to the point where the Al substrate begins to liberate gas. The reactions are run for 30-40 minutes or until a gel suspension or heavy and frothy supernatant is developed. The solution is stirred occasionally until the supernatant completely dissolves into solution and forms a gelatinous suspension.

Following the catalysts preparation is the pre-generation reaction. In the pre-generation reaction, the anode in the main reactor (the stainless steel electrode) is conditioned for AID reaction. In some embodiments, the temperature of the reaction is set in the range from 80° F. to 185° F. The negative charge of applied electricity is connected to the stainless steel electrode and the positive charge is connected to the graphite electrode. Before applying electric voltage, the Cu, Al, and Ag metals are taken out of the solution. Next, 0.3 Volt of electricity is applied. After the current is stabilized, then voltage is added in increments of 0.01 volts of electricity until the voltage is roughly 0.4 volts or until $H_2$ gas is produced at the stainless steel substrate. In some embodiments, it is observed that the pH value of the solution increases quickly during the pre-generation reaction.

Following the pre-generation reaction, the generation reaction is performed. In the generation reactions, the voltage is increased by 0.1 volt increments, such as 0.4V, 0.5V, and 0.6V. The voltage is continuously added to roughly 0.420 volts or until the maximum amount of the gas is generated. During this phase, hydrogen gas is produced at the stainless steel substrate. Then the voltage is reduced by 0.05 volts to find where the gas production falls off.

The hydrogen gas in the above setup is produced from the stainless steel electrode. It is observed that during the reaction, the pH value slowly increases. After the reaction, the pH of the solution decreases to about 6.5.

In some embodiments, the reaction begins with 0.22 g of Al, 0.11 g of copper and 0.17 g of silver metals, and five liters of gas is produced by using this renewable catalytic system.

After the above reactions, the hydrogen generating substance is depleted, so the solution in the main reactor contains the depleted hydrogen generating substance and hydroxides bonded hydroxide shuttles. The solution is transferred from the main reactor to the oxidizer reactor for oxygen reaction to revive the hydroxide bonded hydroxide shuttles and hydrogen generating substance. The gelatinous suspension contains the reactivated hydrogen generating substance, and the solution containing the gelatinous suspension is then transferred back to the main reactor. The oxidizer reactor is able to be a photochemical reactor or the thermal converter. The oxidizer reactor goes on when the pH value of the reacting solution goes up.

Example 2

Figure 5:
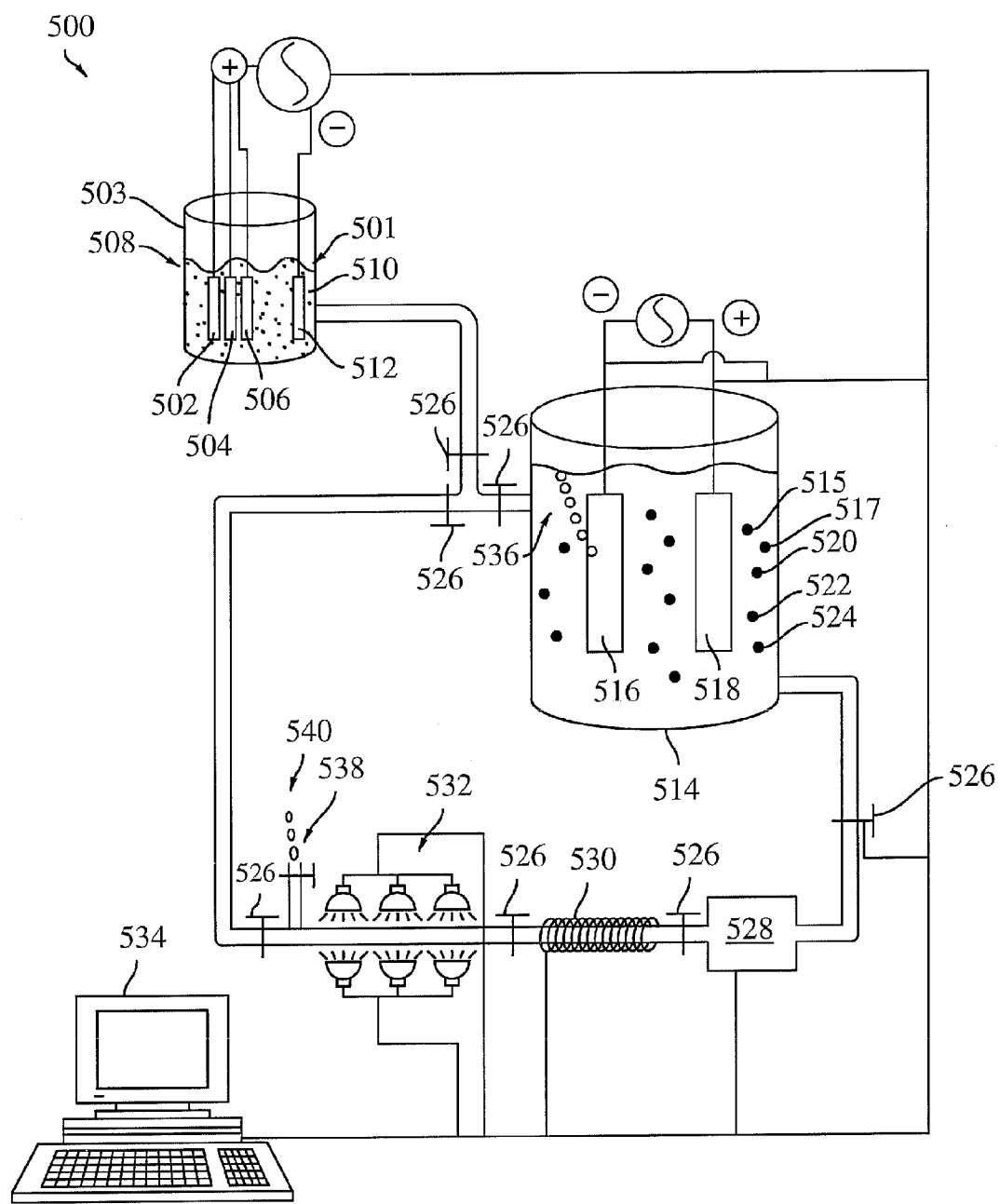
FIG. 5 illustrates a setup 500 in some embodiments.

FIG. 5 illustrates a setup 500 in some embodiments.

In some embodiments, the experiments are performed as follows. The apparatus includes a preparation reactor 503, a main reactor 514, a photochemical/oxidizer reactor 532, and a thermal converter 530.

The reaction begins from preparing a solution 501 containing Al 502 metal 250 mg, Cu 504 metal 50 mg, Ag 506 metal 25 mg, a graphite electrode 512 and 1 liter of water 508 having 1.5% NaCl 510 by weight. A negative voltage 1.7V is applied to the graphite electrode 512 and a first positive voltage 1.7V is applied to the Al metal 502 for 15 minutes. Next, the first positive voltage that is applied to the Al metal 502 is stopped, and a second positive voltage 1.4V is applied to the Cu metal 504 for 10 minutes while the negative voltage −2.5V is concurrently applied to the graphite electrode 512. Next, the second positive voltage to the Cu metal 504 is stopped, and a third positive voltage 1.0V is applied to the Ag metal 506 for 5 minutes with the negative voltage still applied to the graphite electrode 512. The temperature of the solution is maintained at 88° F. In some embodiments, the procedures that are described above include the procedures of ionizing the metals into the solution. In some embodiments, the procedures are catalysts preparation.

Next, the solution 501 is transferred into a main reaction vessel 514. The main reaction vessel 514 comprises aluminium ion 515, copper ion 517, silver ion 520, sodium ion 522, and chloride ion 524. The term "ion" comprises all ligand states of the metal. For example, the aluminium ion include $Al^{3+}$ or $Al(OH)_x$, where the x represents the coordinated ligand numbers of the aluminium ion. In some embodiments, a voltage between 0.4V to 0.9V is applied to the cathode of the electrodes. In alternative embodiments, a voltage 0.85V is applied to the cathode of the electrodes. In other embodiments, a voltage not exceeding 0.9V is applied to the cathode of the electrodes, because it is found that hydrogen production is reduced in some experiments when a voltage exceeding 0.9V is applied. In some embodiments, the applied voltage of the anode is at 0V compared with the standard hydrogen electrode. In alternative embodiments, the anode of the electrodes is the reference electrode, which has a 0V. In some embodiments, the voltage is applied in a way that a negative charge is applied on the stainless electrode 516 and a positive charge is applied at the graphite electrode 518. A electric hydrolysis reaction begins to occur when sufficient voltage is applied, and hydrogen gas 536 is generated at the stainless electrode 516 when the applied voltage is applied on the stainless electrode 516 and the graphite electrode 518. After 30 minutes or when the amount of hydrogen gas production begins to decrease, the solution is transferred through the heater 530 and passing through the LED lights 532 for a photolysis reaction. Oxygen gas 540 is collected at the outlet 538 during the photolysis reaction. The solution is transferred back to the main reaction vessel 514 for hydrogen production.

In some embodiments, a controlling system 534 is connected to all components of the setup 500, including the catalysts preparation vessel 503, the main reaction vessel 514, the valves 526, the heater 530, the LED lights 532, and all electrodes 502, 504, 506, 516, 518. In some embodiments, the controlling system 534 comprises computers, which are able to automate the control of each of the components of the setup 500. Accordingly, the controlling system 534 is able to automate the whole electric hydrolysis process when predetermined conditions have been attended. For example, the controlling system 534 is able to automatically initiate the reaction by applying a voltage to the preparation vessel 503 at a trigger of a predetermined condition when hydrogen gas is needed. The controlling system 534 is able to automatically stop the ionization process of the metals when a pre-set condition has been reached. For example, a pre-set pH value or applied voltage. Similarly, the controlling system 534 is able to automatically transfer the solution 501 among the various chambers or vessels by controlling the pump 528 and the valves 526.

By having the controlling system 534, the setup 500 is able to be controlled remotely. For example, the setup 500 is able to be controlled by a website, through internet, telephone, or PDA. In some embodiments, the processes of the setup 500 can be all automated at the occurring of the predetermined conditions, such as a preset timer or indicator of low fuel of a car.

Figure 6:
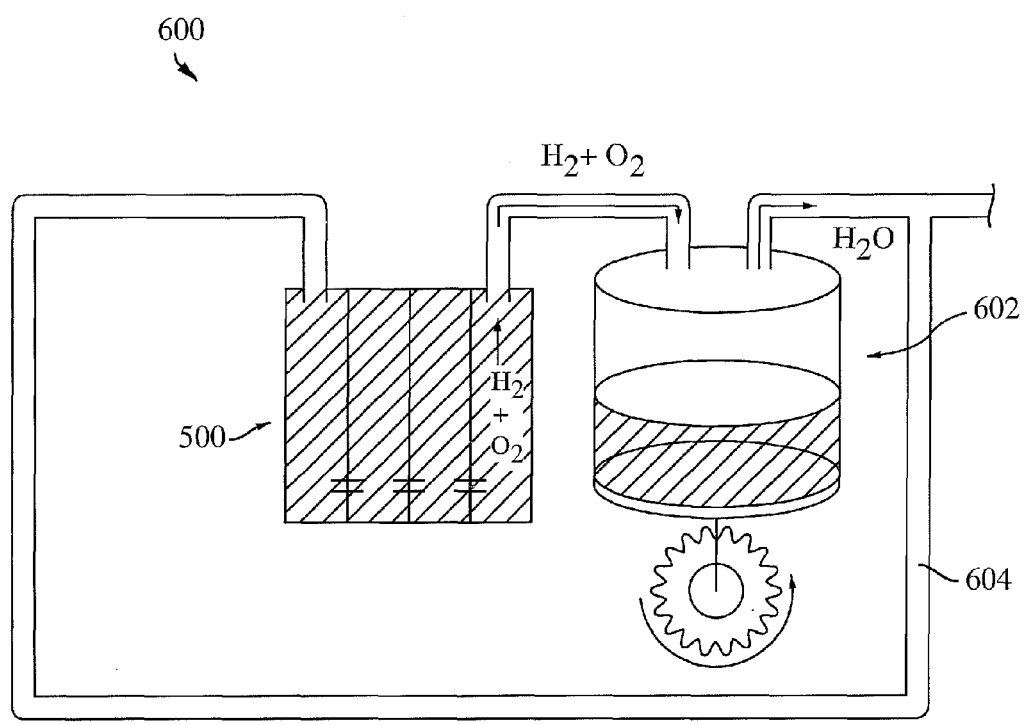
FIG. 6 illustrates an in-situ hydrogen and oxygen production system 600 in some embodiments.

FIG. 6 illustrates an in-situ hydrogen and oxygen production system 600 in some embodiments.

In operation, the system 600 is able to include the setup 500 for in-situ and on-demand hydrogen and oxygen production. The hydrogen and oxygen gas produced is able to go through the same or independent channels 604 to the internal combustion engine 602, which is able to be installed on a car. The water generated through the hydrogen and oxygen combustion reaction can be recycled back to be used again in the setup 500.

The in-situ hydrogen and oxygen production system 600 is able to provide fuels, hydrogen and oxygen gas, on-demand. Accordingly, the system 600 is able to eliminate or replace the need of having high pressure hydrogen gas stored on a vehicle. As a result, the danger of a high pressure storing/distribution device explosion is able to be eliminated and avoided.

Figure 7:
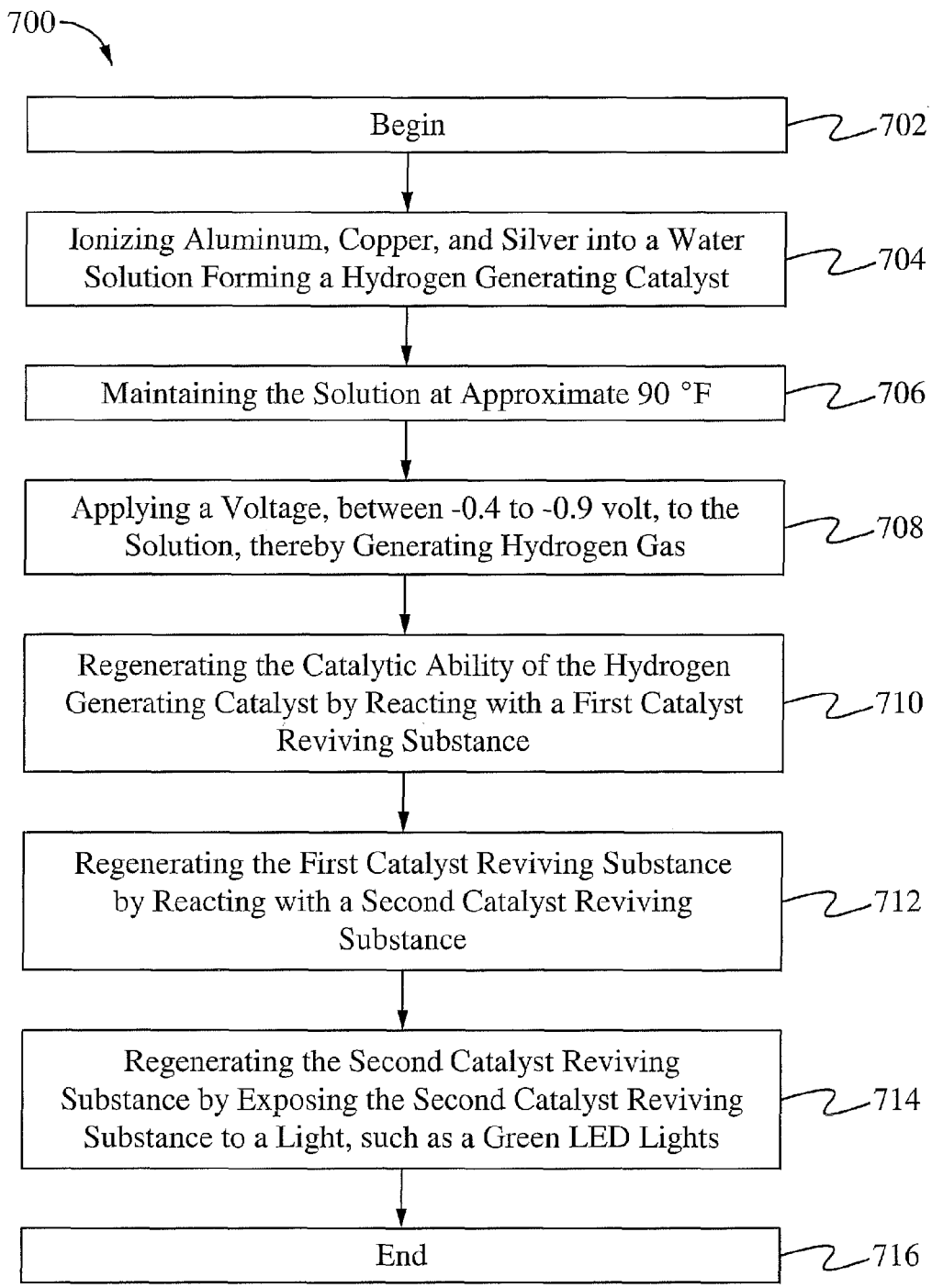
FIG. 7 illustrates a method of electric hydrolysis reaction 700 for hydrogen production in accordance with some embodiments.

FIG. 7 illustrates a method of electric hydrolysis reaction 700 for hydrogen production in some embodiments.

The method begins at the step 702. At a step 704, aluminum, copper, and silver is ionized into a water solution forming a hydrogen generating catalyst. At a step 706, the solution is maintained at approximate 90° F. At a step 708, a voltage, between −0.4 to −0.9 volts, is applied to the solution or the cathode of the electrodes, thereby generating hydrogen gas. At a step 710, the catalytic ability of the hydrogen generating catalyst is regenerated by reacting with a first catalyst reviving substance. At a step 712, the first catalyst reviving substance is regenerated by reacting with a second catalyst reviving substance. At a step 714, the second catalyst reviving substance is regenerated by exposing the second catalyst reviving substance to a light, such as green LED lights. The method 700 ends at a step 716.

Accordingly, some embodiments of the present application are able to include the chemical reactions: a REDOX reaction, a pre-generation reaction, a generation reaction, a regeneration reaction, a second hydrogen reaction, and an oxygen reaction. Alternatively, some embodiments are able to include the chemical reactions: a catalyst preparation reaction, a hydrogen generation reaction, a catalyst regeneration reaction, and a catalyst regeneration substance regeneration reaction.

The embodiments disclosed in this disclosure provide apparatuses for and methods of on-demand producing hydrogen and oxygen. Further, reactants and catalysts used in this disclosure are environmental safe and sustainable materials. Such advantageous features are able to be applied in various fields, such as fuel technology, renewable energy, batteries, food, petrochemical, cement, and car industries.

In some embodiments, the process is mainly driven by the energy of heat to produce hydrogen. This reaction is electrically activated and the electrical energy consumed is mainly for catalyst activation. In some embodiments, the amount of heat applied to the system, less the heat loss in the system, is proportional to the amount of $H_2$ generated. In some embodiments, the reaction is endothermic, and the system absorbs heat to produce $H_2$. The $H_2$ stores the heat energy absorbed by the system.

All the steps that are contained in the methods/procedures described above are some embodiments of the present application. All the steps are optional and all the steps when applicable are able to be performed in any sequences or order as desired. Additional steps are also able to be added when a person skilled in the art deem proper.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A catalytic water electric hydrolysis system comprising:
   a) a main reactor including:
      a. a non-acidic solution containing a hydrogen generating catalyst, wherein the hydrogen generating catalyst contains a charge-treated aluminium metal, a charge-treated copper metal, and a charged-treated silver metal;
      b. an electric energy providing device providing a voltage no greater than 1V on the hydrogen generating catalyst containing the charge-treated aluminium, copper, and silver metals, such that hydrogen is catalytically generated by the no greater than 1V voltage applied to the hydrogen generating catalyst without a stochiometric consumption of hydrocarbons; and
      c. an electric circuit providing a voltage greater than 1V, used to provide the charge-treated aluminium metal, the charge-treated copper metal, and the charge-treated silver metal;
   b) an oxidizer reactor containing a light providing device and the non-acidic solution containing a depleted hydrogen generating catalyst wherein the depleted hydrogen generating catalyst contains an aluminum metal complex, a silver metal complex and a copper metal complex; and
   c) a controlling system configured to transfer the non-acidic solution from the main reactor to the oxidizer reactor when the hydrogen generating catalyst becomes depleted and from the oxidizer reactor back to the main reactor when the hydrogen generating catalyst is regenerated by the light providing device from the depleted hydrogen generating catalyst.

2. The system of claim 1, wherein the non-acidic solution further comprises sodium ions.

3. The system of claim 1, wherein the non-acidic solution further comprises an ion from IA or IIA group.

4. The system of claim 1, wherein the non-acidic solution further comprises a salt in an amount sufficient as electrolyte.

5. The system of claim 1, wherein the non-acidic solution comprises various hydroxide formulations of aluminium hydroxide.

6. The system of claim 5, wherein the aluminium hydroxide comprises $Al(OH)_3$.

7. The system of claim 1, wherein the non-acidic solution comprises copper hydroxide and silver hydroxide.

8. The system of claim 1, wherein non-acidic solution comprises silver oxide.

9. The system of claim 1, wherein the non-acidic solution comprises a sufficient amount of copper ions and silver ions to regenerate the hydrogen generating catalyst.

10. The system of claim 1 further comprising a heat source.

11. The system of claim 1, wherein the light providing device comprises LED lights.

12. The system of claim 1, wherein the light providing device provides lights having wavelengths approximately around the visible light region.

13. The system of claim 1, wherein the controlling system comprises a computer automating substantial all of the transportation of the non-acidic solution.

14. The system of claim 1, wherein the controlling system transfers the solution containing a gelatinous suspension back to the main reactor.

15. The system of claim 1, wherein the light providing device provides a light having a wavelength regenerates a silver ion from silver oxide.

* * * * *